United States Patent [19]

Ferrar

[11] Patent Number: 5,137,360
[45] Date of Patent: Aug. 11, 1992

[54] FIBER OPTIC GYRO WITH A SOURCE AT A FIRST WAVELENGTH AND A FIBER OPTIC LOOP DESIGNED FOR SINGLE MODE OPERATION AT A WAVELENGTH LONGER THAN THE FIRST WAVELENGTH

[75] Inventor: Carl M. Ferrar, East Hartford, Conn.

[73] Assignee: Honeywell Inc., Minneapolis, Minn.

[21] Appl. No.: 633,545

[22] Filed: Dec. 21, 1990

[51] Int. Cl.⁵ .............................................. G01C 19/72
[52] U.S. Cl. .................................................... 356/350
[58] Field of Search ............................ 356/350, 345; 250/227.27

[56] References Cited

U.S. PATENT DOCUMENTS

| 4,529,313 | 7/1985 | Petermann et al. | 356/350 |
| 4,634,282 | 1/1987 | Shaw et al. | 356/350 |
| 4,789,241 | 12/1988 | Michal et al. | 356/350 |
| 4,881,817 | 11/1989 | Kim et al. | 356/350 |
| 4,915,503 | 4/1990 | Pavlath | 356/350 |

Primary Examiner—Samuel Turner
Attorney, Agent, or Firm—Donald J. Lenkszus

[57] ABSTRACT

A low cost fiber optic gyro includes a Sagnac interferometer configured in a minimum reciprocal configuration and modified to use a 0.8 micron wavelength laser diode as the interferometer light source and 1.3 micron, single-mode fiber for the sensing coil.

10 Claims, 1 Drawing Sheet

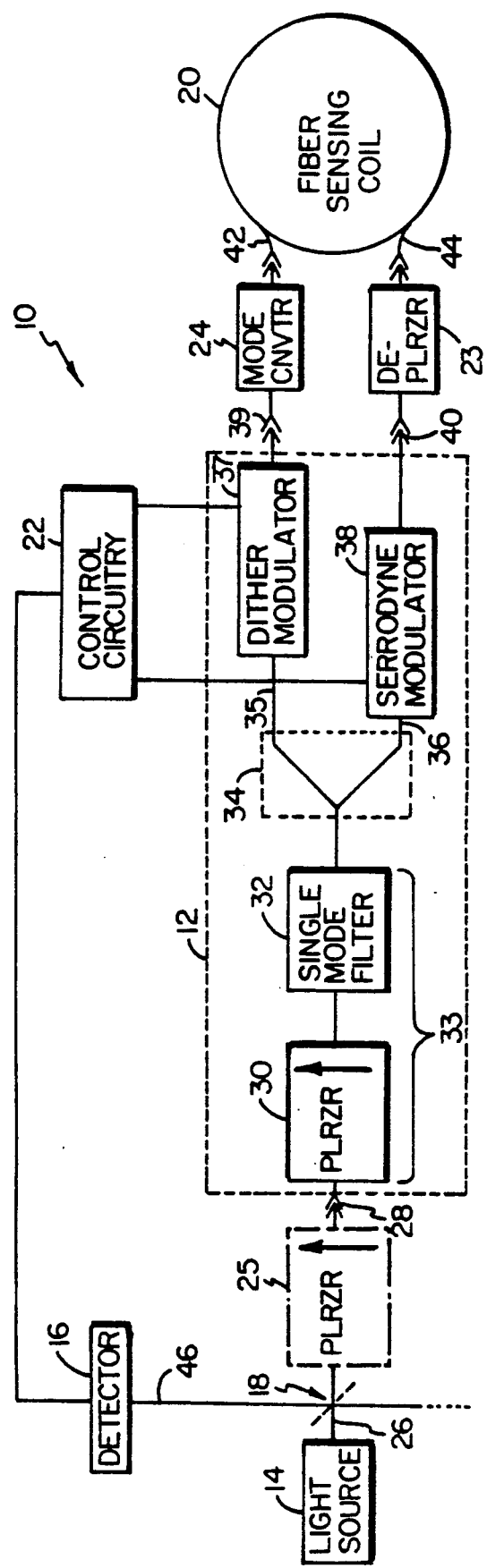

FIBER OPTIC GYRO WITH A SOURCE AT A FIRST WAVELENGTH AND A FIBER OPTIC LOOP DESIGNED FOR SINGLE MODE OPERATION AT A WAVELENGTH LONGER THAN THE FIRST WAVELENGTH

DESCRIPTION

1. Technical Field

This invention relates to fiber optic gyros, and more particularly to optical interferometer type rotation sensors.

2. Background Art

Measurement of rotation rate is required in applications ranging from robotic and ballistic missile control, to aircraft and spacecraft navigation. Performance accuracy ranges from 0.001 to 0.01 degrees/hour for Inertial Grade spacecraft/aircraft navigation systems ($10^{-3}$ to $10^{-4}$ of earth's 15 degrees/hour rotation rate), through Moderate Grade sensing accuracies of 0.02 to 1.0 degrees/second. Intermediate Grade performance is in the 0.1 to 10 degrees/hour range.

Although spacecraft navigation usually relies on spinning wheel gyros, advances in laser technology have allowed dual laser beam gyros ("laser gyros") to be used in high performance applications such as aircraft navigation systems. The laser gyro offers fast startup, small size, lower cost, and most importantly the absence of moving mechanical parts. An outgrowth of the laser gyro is the fiber optic gyro (or "FOG"), which is an alternative type of interferometric rotation sensor.

The FOG can be smaller, more rugged, and less costly than the laser gyro, making it ideally suited for lower performance (Moderate and Intermediate Grade) applications in the field of advanced projectiles. Projectile applications for which the FOG is particularly well suited are roll attitude determination, body rate sensing, and seeker stabilization.

The FOG uses a Sagnac interferometer to measure rotation based on the principle that the transit time of an optical signal propagating through a fiber optic loop rotating about an axis perpendicular to its plane, varies with the loop rotation rate. The transit delay for two optical signals traversing the loop in opposite directions creates a Sagnac phase differential that is proportional to loop rotation rate:

$$S = \frac{2 \cdot \pi \cdot L \cdot d}{\lambda \cdot c} \cdot \Omega \quad \text{(Equation 1)}$$

where: S is the Sagnac phase difference in radians, L is the length of the fiber loop, d is the loop diameter, $\lambda$ is the optical signal wavelength, c is the speed of light, and $\Omega$ is the loop rotation rate in radians/sec.

Phase detection sensitivity may be increased by modulating both optical signals with a sinusoidal phase modulator positioned at one end of the loop. The optical transit time delay causes the modulator to act on the counter circulating light beams at different times, dithering the phase difference magnitude and permitting use of sensitive AC processing to detect rotation-induced phase differences.

When counter propagating signals of unit intensity are combined interferometrically, the intensity (I) is:

$$I = \tfrac{1}{2} \cdot (1 + \cos P) \quad \text{(Equation 2)}$$

where P is the total phase difference (Sagnac and phase modulation).

The intensity I versus Sagnac phase difference relationship is a cosine function. At zero rotation the phase difference is zero and the signals interfere constructively to produce a maximum intensity. Loop rotation creates a phase differential, causing the signals to destructively interfere and reduce the intensity.

Bessel expansion of the intensity expression at the modulation frequency (f) produces the rotational velocity component:

$$F = k \cdot \sin(S) \quad \text{(Equation 3)}$$

$$\text{where } k = 2 \cdot J_1 \cdot [2A \cdot \sin(\pi \cdot f \cdot T)], \quad \text{(Equation 4)}$$

and the term $2A \cdot \sin(\pi \cdot f \cdot T)$ is the dithered phase difference modulation of amplitude (A) and modulation frequency f. The coil transit time is T and, if (A) is fixed, F is maximized when $f = \tfrac{1}{2}T$; the coil eigenfrequency.

The analog value of F can be measured directly as an indication of rotation, or the signal amplitude can be continuously nulled by a closed loop serrodyne modulator which adds an optical phase bias in opposition to the Sagnac phase difference. This is a repetitive linearly ramped phase modulator positioned at one end of the fiber coil. A peak ramp amplitude of $2\pi$ radians produces an effectively constant phase difference bias between the oppositely directed beams. The ramp repetition frequency, which is proportional to the phase bias amplitude, provides a measurable representation of the loop rotation rate.

The rotation sensing accuracy critically depends on the counter propagating signals travelling identical ("reciprocal") optical paths at zero rotation rate (and zero applied bias). The necessary reciprocity can be assured by arranging the optic elements in a "minimum reciprocal configuration" which requires the optical signals to pass through a common single-spatial-mode filter and a single-polarization filter when propagating from the source to the sensing coil and from the coil to the detector. This ensures that the counter propagating optical signals received by the detector will travel identical paths, associated with a single spatial mode and a single polarization, even if multiple spatial modes and polarizations exist in the optical path due, for example, to fiber birefringence effects and scattering and cross-coupling between spatial modes.

In practice, when the filtering is imperfect, the FOG offset errors associated with residual polarization and spatial-mode-related non-reciprocity (as well as several other types of errors) may be reduced through use of a broadband, short coherence length optical source and high birefringence optic fiber in the sensing coil. This makes the selected mode counter propagating waves incoherent with certain cross coupled waves.

The FOG offers the potential for good performance and low cost. Components required for FOG fabrication are readily available at wavelengths near 0.8 and 1.3 microns. The longer wavelength offers the advantage of: generally lower light loss, easier coupling of components, and greatly reduced photorefractive effects in LiNbO3 integrated optic devices.

The selection of component, however, affects the cost/performance tradeoff. If low cost is a primary objective, it may be difficult to choose between operation at the 1.3 micron wavelength for which communication grade fiber is readily available at low cost, but the most appropriate light sources are very expensive, or operation at the 0.8 micron wavelength at which suitable inexpensive laser sources are readily available but the fiber is expensive.

DISCLOSURE OF INVENTION

The object of the present invention is to provide a low cost rotation sensor design for use in moderate and intermediate grade fiber optic gyros.

According to the present invention, a Sagnac interferometer is provided in a known minimum reciprocal configuration, including a single polarization filter and a single spatial mode filter located in the common light path between the source/detector and the sensing loop, but which further includes spatial mode conversion in the sensing loop to permit use of sensing-loop fiber which may be multi-moded at the wavelength of the interferometer light source (e.g. a 1.3 micron single-mode fiber sensing coil with a 0.8 micron wavelength laser diode light source) to retrieve at least a minimum level of optical power from undesired spatial modes into the desired spatial mode.

In further accord with the present invention, the sensing loop single mode fiber is non-polarization maintaining fiber, and the interferometer further comprises a depolarizer located in the sensing loop to prevent signal fading.

In the prior art the use of multi-mode fiber for the sensing coil fiber is usually considered inappropriate. The conventional multi-mode fiber supports a large number of modes and the high degree of singlemode filtering then required to ensure reciprocity becomes impractical because it extracts and sends to the detector only a very small fraction of the available light. I have found, however, that the required filtering can be incorporated without unacceptably degrading the detected light levels if the sensing loop fiber supports only a small number of modes, and if mode-conversion means in the sensing loop ensures that a reasonable fraction of the light in any undesired modes is returned to the desired mode for detection.

These and other objects, features, and advantages of the present invention will become more apparent in light of the following detailed description of a best mode embodiment thereof, as illustrated in the accompanying Drawing.

BRIEF DESCRIPTION OF DRAWING

The sole Drawing FIGURE is a system block diagram of a rotation sensor according to the present invention.

BEST MODE FOR CARRYING OUT THE INVENTION

As known, the minimum reciprocal configuration Sagnac interferometers yield enhanced FOG performance by minimizing output errors associated with undesired polarizations and spatial modes. Prior art high performance FOG systems have typically required, in addition, the use of low coherence superluminescent diode (SLD) light sources and highly birefringent (polarization preserving) sensing loop fiber to further reduce these errors. The prices, however, of the SLD and polarization preserving fiber are a significant portion of the overall sensor cost.

The present invention comprises a minimum reciprocal configuration Sagnac interferometer, modified to permit use of a low cost laser diode optical source (e.g., at 0.8 micron wavelength) and low cost non-polarization-preserving sensing coil fiber (e.g., fiber which is single-moded at 1.3 microns but may be moderately multi-moded at the source wavelength). The minimum reciprocal configuration in combination with added components described hereinafter, produces a rotation sensor suitable for use in intermediate grade FOGs but at a significantly lower cost than the prior art devices.

Referring to FIG. 1, an interferometer according to the present invention 10, includes an integrated optic chip (IOC) 12, a light source 14, light detection circuitry 16, an output tap 18 (which may be a directional coupler or a beam splitter), a fiber optic sensing coil 20, and control circuitry 22. As described in detail hereinafter, the present interferometer further includes a depolarizer 23 and a mode converter 24 connected between the IOC 12 and the sensing loop 20. An optional polarizer 25 (shown in phantom) may be located between the light source and the IOC.

The light source 14 comprises a multi-mode low coherence (wide bandwidth) 0.8 micron wavelength laser diode. It is desirable in an interferometric FOG to use an optical source with a wide line width (low coherence) and high power coupling into an optical fiber. Superluminescent diodes (SLDs) have been used extensively in high performance FOG systems because they offer a good compromise between power coupling and line width. SLDs, however, are very expensive due to low volume production. Alternatively, multi-mode laser diodes are available with 2–3 nanometer bandwidths (about one-fifth that of SLDs but sufficient to ensure reasonably low coherence) and with coupled optical output powers approaching one milliwatt, but at less than one tenth the cost of the SLD. This type of laser diode has been selected as the best cost to performance trade-off for the interferometer light source.

The source provides the light beam on output fiber 26 to the tap 18. The tap rejects a portion of the light (e.g., 50%), which may be used for other purposes, and transmits the remainder through waveguide 28 to the IOC 12. The waveguide 28 is an optical fiber which is single-moded at the source wavelength. The IOC, which also operates single-moded at 0.8 microns, is formed using a two step proton exchange technique described in a commonly owned, copending application entitled *Single-Polarization, Integrated Optical Components for Optical Gyroscopes*, S/N 329,121, filed Mar. 27, 1989 by Suchoski et al.

The IOC includes a single polarization filter 30 and a single spatial mode filter 32 formed in a waveguide section 33. The polarization filter extinction ratio is on the order of 60 dB. The waveguide 33 is the "common path" for propagating the source optical signal to the sensing coil 20 and for guiding return propagation of the interference signal from the coil to the detection cicuitry 16. The spatial-mode filter ensures that only selected spatial mode light enters the sensing coil and only selected mode optical power is coupled back from the loop to the detector.

The filtered optical signal approaching the sensing loop is presented to a beam splitter/combiner 34, e.g. either a Y-junction or a 3 dB directional coupler, which divides the source optical signal into two equal intensity optical signals presented on waveguide sections 35, 36. In the best mode embodiment a phase ("dither") modulator 37 and a serrodyne modulator 38 (each described hereinafter) are connected to the guide sections 35, 36, respectively. The modulated optical signals at IOC connections 39, 40 are presented through the depolarizer 23 and mode conversion means 24 to the opposite ends 42, 44 of the sensing loop.

After circulating through the sensing loop, light returns toward the source, being combined at splitter/combiner 34 into an interference signal which then proceeds back along the common path guide 33, through the mode filter and polarizer, to tap 18 which extracts a portion (e.g., 50%) of the signal and couples it through path 44 to detection circuitry 16, the remainder of this signal being guided toward the source and effectively lost. The path 46 may be an optical fiber which may be single moded at the source wavelength. The detection circuitry may include a known PIN-diode transimpedance amplifier detection system.

In the best mode embodiment, a closed loop serrodyne modulation technique is used to measure the Sagnac phase difference. This makes the measurement insensitive to intensity variations resulting from fluctuations of the light source or from multi-mode transmission of the light through the sensing loop. The serrodyne modulator 38 applies a linear ramped phase modulation to each of the counter circulating light beams. If the ramp peak amplitude is $2\pi$ radians and the flyback is essentially instantaneous, the serrodyne modulation, acting on the two signals at different times due to optical delay in the coil, adds an effectively constant bias to the differential phase. The bias can be controlled by a servo loop within the control circuitry 22 to continuously oppose, and null, the Sagnac phase difference. The serrodyne frequency then constitutes a gyro output proportional to the loop rotation rate.

The phase modulation of the beams is provided by the dither modulator 37, which causes the interference signal amplitude to dither. This allows for AC detection of the differential phase. The dither amplitude is at a maximum when the modulation frequency is equal to the eigenfrequency of the fiber sensing coil. This modulation frequency also offers other known advantages in reducing certain types of FOG measurement errors.

In the best mode embodiment the sensing coil fiber is a 1.3 micron, non-polarization preserving, single mode fiber. The fiber was selected because of its commercial availability and low cost. The cost per meter is approximately one-fifth that of non-polarization preserving single mode fiber designed to operate at 0.8 microns, and less than 1/20th the cost per meter of 1.3 micron polarization preserving (high birefringence) fiber.

Multiple modes (typically two to five) may exist in the 1.3 micron fiber when operating with 0.8 micron optical signals. In this case it is conceivable that substantially all of the selected mode optical power might become converted to an undesired mode during propagation through the loop, leaving no selected mode light for return to the detector. To prevent this it is necessary to functionally incorporate mode converter (or "mode-scrambler") means at one or both ends of the loop. This ensures that some light from any existing mode will couple into the desired mode before leaving the loop. The light so coupled will pass through the selected-mode filter 32 to the detector 16.

The mode conversion feature may be accomplished by control of the sensing coil geometry, i.e. by controlling the coil diameter and the fiber winding technique. The range of acceptable diameter values is not critical. Small diameter values tend to be associated with high winding stresses and fiber distortions which enhance the spatial mode cross coupling (scrambling). At the same time, a small diameter increases the attenuation of high order modes and so may ultimately lead to single mode transmission through the coil, obviating the need for scrambling. However too small a diameter (e.g., less than about 2 cm) may also unacceptably increase the attenuation for even the desired mode.

Subject to physical packaging limits, a large diameter coil provides greater FOG sensitivity. However, a large diameter (e.g., greater than 8 cm), combined with a smooth winding technique with controlled fiber crossovers, may yield little or no spatial mode selection or conversion. In this case it may be necessary to incorporate a separate, discrete mode scrambling means comprising any one of the known scrambler configurations, such as a serpentine series of small random fiber bends at one end of the fiber coil.

In laboratory experiments using a 16 cm diameter 180 meter long random-wound coil of conventional single-mode 1.3 micron communications fiber it was found unnecessary to include a separate mode scrambler, suggesting that fiber crossovers in such a coil may provide adequate mode mixing.

The use of non-polarization-preserving single mode fiber in the best mode embodiment also increases the chance of environmentally sensitive polarization mode coupling into undesired polarizations. To prevent the possibility that all light might couple out of the desired polarization (polarization fading), the depolarizing means 23 may be included at one or both ends of the sensing loop. When a low coherence light source is used, a depolarizer for this purpose may, for example, comprise a short length of high birefringence (polarization preserving) fiber connected with properly orientated polarization axes relative to the IOC, using methods known to those skilled in the art. The anti-fading action of the depolarizer is analogous to that of the mode scrambler described above. It ensures that some light will always return to the detector in the desired polarization. However, it also ensures that a similar amount of light will return toward the detector in the undesired polarization, so the extinction ratio of the polarizer needed to block this light must be higher than if substantially all returning light were in the desired polarization state.

The extinction ratio of the IOC polarization filter 30 is on the order of 60 dB. It is not now known whether larger extinction coefficients can be obtained by increasing the length of the IOC waveguide 33, or whether there is a performance limit at 60 dB beyond which a single-substrate IOC polarizing filter fails to improve with length. Such a limit might result from re-entry of previously rejected light into the primary waveguide.

Tests have shown, however, that polarization related errors in a Sagnac interferometer employing a proton exchanged IOC based on a lithium niobate substrate and having an effective extinction coefficient of about 60 dB can be substantially reduced by inserting a supplemental polarizer just ahead of the input to the IO circuit. Polarization-related errors in the output of our experimental gyro were typically less than 10 degrees/hour equivalent rotation rate when only the IOC polarizer was used. However, when a commercial prism type polarizer specified to have a 60 dB extinction coefficient was inserted ahead of the IO polarizer, the errors decreased to less than 1 degree/hour.

Depending on the performance accuracy required for a particular application, it may be preferable to include the supplemental polarizer 25, shown in series with the IOC 12 in FIG. 1. This configuration effectively separates the two polarizers and achieves enhanced polarization extinction. The supplemental polarizer need not be of the prism type. It may be an additional, separate-substrate IOC polarizinq element, or any other known type of fiber polarizer.

Test results have shown that the present rotation sensor exhibits output noise and drift no larger than a few degrees/hour, indicating that gyros constructed in accordance with the above-described ideas may be useful in a variety of applications where cost is important and moderate performance levels are required.

It should be understood that the source and sensing fiber wavelengths need not be limited to 0.8 and 1.3 microns. Any relatively short wavelength light source may be used in combination with any relatively long wavelength sensing fiber. For example, the source wavelength may range from 750 to 900 nanometers and the design wavelength of the fiber may range from 1200 to 1600 nanometers.

Similarly, although the invention has been shown and described with respect to a best mode embodiment thereof, it should be understood by those skilled in the art that the foregoing and various other changes, omissions, and additions in the form and detail thereof, may be made therein without departing from the spirit and scope of this invention.

We claim:

1. An interferometric rotation sensor, comprising:
    optical signal source means, for providing a source optical signal;
    optical fiber sensing loop means, for providing, in the presence of loop rotation, a Sagnac phase difference between two sensing loop optical signals propagating in counter circulating paths therethrough;
    integrated optic circuit (IOC) means, having a substrate with a waveguide array formed thereon, said waveguide array including a bi-directional common path section responsive to said source optical signal, said common path having a single polarization mode filter and a single spatial mode filter formed therein to pass select mode optical signals having a desired spatial mode and a desired polarization mode, said waveguide means further including beam splitter/combiner means for splitting said select mode optical signal received from said common path into said two sensing loop optical signals for counter propagation through said sensing loop means, and for combining sensing loop optical signals received from said loop into a common interference signal for return through said common path, said interference signal amplitude being dependent on the magnitude of said Sagnac phase difference;
    detector means, for sensing the amplitude of said interference signal; and
    means for coupling said source optical signal to said IOC means and for coupling said interference signal from said IOC means to said detector means;
    as characterized by:
    said optical signal source means comprising a laser diode having a source optical signal wavelength;
    said sensing loop fiber comprising an optical fiber which is designed for single mode operation at a wavelength which is longer than said source wavelength, and wherein said sensing loop fiber embodies a signal mode conversion characteristic therein, to prevent sensing loop cross coupling of all optical power from the select spatial mode to undesired spatial modes.

2. The rotation sensor of claim 1, wherein said sensing loop comprises a fiber coil configuration having a fiber winding geometry which causes said sensing loop to display inherent mode conversion characteristics.

3. The rotation sensor of claim 1, wherein said sensing loop coil configuration comprises a discrete mode conversion element positioned at one end of said sensing loop coil.

4. The rotation sensor of claim 3, wherein said discrete mode conversion element comprises a serpentine segment of fiber bends positioned at one end of the sensing loop coil.

5. The rotation sensor of claim 1, wherein said source wavelength is on the order of 0.8 microns and the sensing loop optical fiber is designed to operate at a wavelength on the order of 1.3 microns.

6. The rotation sensor of claim 1, further comprising depolarization means, at least one, located between the sensing loop coil and said IOC combiner/splitter, to prevent sensing loop cross coupling of all optical power from the desired polarization mode to an undesired mode.

7. The rotation sensor of claim 6, wherein said depolarization means comprises a length of single mode fiber having high birefringence.

8. The rotation sensor of claim 1, further comprising:
    serrodyne modulation means, for applying a linear ramped phase modulation to said sensing loop optical signals, to provide a phase bias in opposition to the Sagnac phase difference; and
    control circuitry, for continuously changing the value of the serrodyne modulation frequency in dependence on said interference signal amplitude so as to cause the phase bias to continuously null the Sagnac phase difference magnitude, whereby the nulling value of the serrodyne modulation frequency is proportional to said sensing loop rotation rate.

9. The rotation sensor of claim 6, further comprising discrete polarizer means, positioned between said means for coupling and said IOC common path waveguide segment, to increase the extinction ratio of said IOC single polarization filter.

10. The rotation sensor of claim 5, wherein said source wavelength may range from 750 to 900 nanometers and the design wavelength of the sensing loop fiber may range from 1200 to 1600 nanometers.

* * * * *